United States Patent

Pulvermüller

[11] Patent Number: 4,665,808
[45] Date of Patent: May 19, 1987

[54] COFFEE PERCOLATOR

[75] Inventor: Peter Pulvermüller, Bad Ditzenbach, Fed. Rep. of Germany

[73] Assignee: Wuerttembergische Metallwarenfabrik AG., Fed. Rep. of Germany

[21] Appl. No.: 808,534

[22] Filed: Dec. 13, 1985

[51] Int. Cl.$^4$ ............................................ A47J 31/00
[52] U.S. Cl. ...................... 99/285; 99/289 R; 222/66
[58] Field of Search ............... 99/289 R, 289 T, 280, 99/285, 287, 279, 295, 299; 222/66; 366/142, 143; 494/10; 426/433

[56] References Cited

U.S. PATENT DOCUMENTS

| | | | |
|---|---|---|---|
| 1,398,790 | 11/1921 | Ogur | 222/66 |
| 2,517,073 | 8/1950 | Alvarez | 99/289 R |
| 3,253,534 | 5/1966 | Ross | 99/289 R |
| 3,941,042 | 3/1976 | Wells | 99/289 R |
| 4,572,060 | 2/1986 | Yung-Kuan | 99/285 |

*Primary Examiner*—Robert W. Jenkins
*Attorney, Agent, or Firm*—Arnold, White & Durkee

[57] ABSTRACT

Described is a coffee percolator having a reservoir provided with means for sensing the filling level of coffee meal therein. The filling level sensing means comprises an electro-optical sensor secured to the outer side of the reservoir across a corner formed by portions of a sidewall and a bottom wall. An emitter and a receiver of said electro-optical sensor are disposed along an optical axis extending through the interior of the reservoir substantially diagonally across the corner, the sidewall and the bottom wall being optically transparent at least at the locations whereat the optical axis passes therethrough.

10 Claims, 5 Drawing Figures

COFFEE PERCOLATOR

DESCRIPTION

The present invention relates to a coffee percolator having a reservoir for coffee meal and filling level sensing means for the coffee meal within said reservoir, said filling level sensing means comprising an electro-optical sensor. This optical sensor emits a signal when the filling level of the coffee meal within the reservoir has dropped below a minimum level, necessitating the reservoir to be refilled. This signal may be employed for an indication, for switching the percolator off, or for automatically controlling a reservoir refilling device.

BACKGROUND OF THE INVENTION

Reservoirs that have become known up to the present include an electro-optical sensor comprising an emitter and a receiver disposed on opposite sidewalls of the reservoirs on an optical axis extending across the full cross-section of the reservoir generally parallel to the bottom thereof, i.e. the emitter and the receiver are located at the same level above the bottom of the reservoir. This results in a relatively great length of the optical axis, whereby the adjustment or alignment of the emitter and receiver is rendered rather difficult. If a reservoir of this type is moreover provided with conveyor means, for instance a screw conveyor for conveying the coffee meal from the reservoir to the brewing section, the optical axis cannot be disposed as closely over the bottom as would in fact be required for accurately determining a minimum filling level.

SUMMARY OF THE INVENTION

It is therefore an object of the invention to provide a coffee percolator having a coffee meal reservoir with an improved arrangement of an electro-optical sensor for sensing the minimum filling level.

It is a further object of the invention to provide a coffee percolator having a coffee meal reservoir including a screw conveyor, wherein the coffee meal filling level within the reservoir may be sensed by means of an electro-optical sensor at the lowest possible position.

It is a further object of the invention to provide a coffee percolator having a coffee meal reservoir including filling level sensing means in the form of an electro-optical sensor, wherein the sensor of said filling level sensing means may be mounted in a simple manner and does not require adjustment after having been so mounted.

It is a further object of the invention to provide a coffee percolator having a coffee meal reservoir and a filling level sensing means which is reliable in operation.

Further objects of the invention will become evident from the following description with reference to the accompanying drawings.

BRIEF DESCRIPTION OF THE DRAWINGS

An embodiment of the invention shall now be described in more detail by way of example with reference to the accompanying drawings, wherein.

DESCRIPTION OF THE PREFERRED EMBODIMENTS

Figure 1:
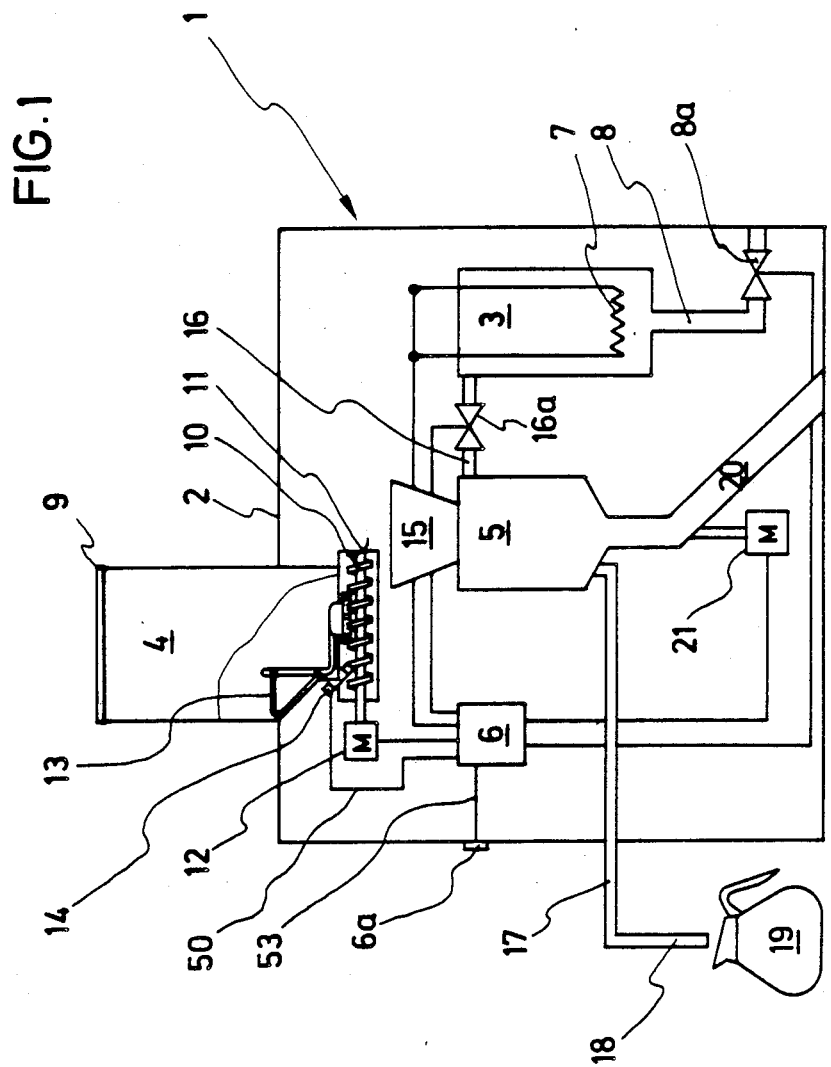
FIG. 1 shows a diagrammatical representation of a coffee percolator to which the invention may be applied.

Diagrammatically shown in FIG. 1 is a coffee percolator 1 having a housing 2 likewise shown in diagrammatic represntation. Coffee percolator 1 may be of any known type. The coffee percolator 1 shown comprises a water heating container 3 disposed within housing 2, a coffee meal reservoir 4, a brewing section 5, and a control unit 6 adapted to be actuated by a manual selector switch 6a via a conductor 53. Water heating container 3 contains a heater 7 and is provided with a cold water supply 8 extending from outside of housing 2 and including a valve 8a. Heater 7 and valve 8a are controlled by control unit 6. Reservoir 4 is accessible from the outside of housing 2 through a lid 9 disposed on top of housing 2 and removable for the supply of coffee meal to reservoir 4. Disposed on the bottom of reservoir 4 is a screw conveyor 10 for conveying the coffee meal contained in reservoir 4 out of the reservoir 4 through an opening 11. Screw conveyor 10 is driven by a motor 12 under the control of control unit 6. Screw conveyor 10 itself drives a wiper blade 13 effective to feed the coffee meal from reservoir 4 to screw conveyor 10. Also disposed adjacent the bottom of reservoir 4 is a filling level sensing means 14 connected to control unit 6 through a cable 50. Filling level sensing means 14 and reservoir 4 with its internal components shall be described in detail as the description proceeds.

Discharge opening 11 of reservoir 4 is disposed above a filling funnel 15 of brewing section 5. Brewing section 5 may again be of any known type. One such brewing sections is described in detail in German Pat. No. 1,454,109, first publisehd on Mar. 20, 1969. A hot water conduit 16 extending from water heating container 3 opens into an upper portion of brewing section 5 and is provided with a valve 16a controlled by control unit 6. A conduit 17 for the percolated coffee beverage extends from a lower portion of brewing section 5 towards an outlet 18 outside of housing 2, with a receptacle, in the example shown a jug 19, being adapted to be placed therebelow. A coffeegrounds discharge conduit 20 extends from the lowermost point of brewing section 5 likewise to the outside of housing 2. Associated to brewing section 5 is a motor 21 for controlling the successive operating steps such as charging brewing section 5, brewing the coffee, flushing the coffeegrounds etc. under the control of control unit 6.

Figure 2:
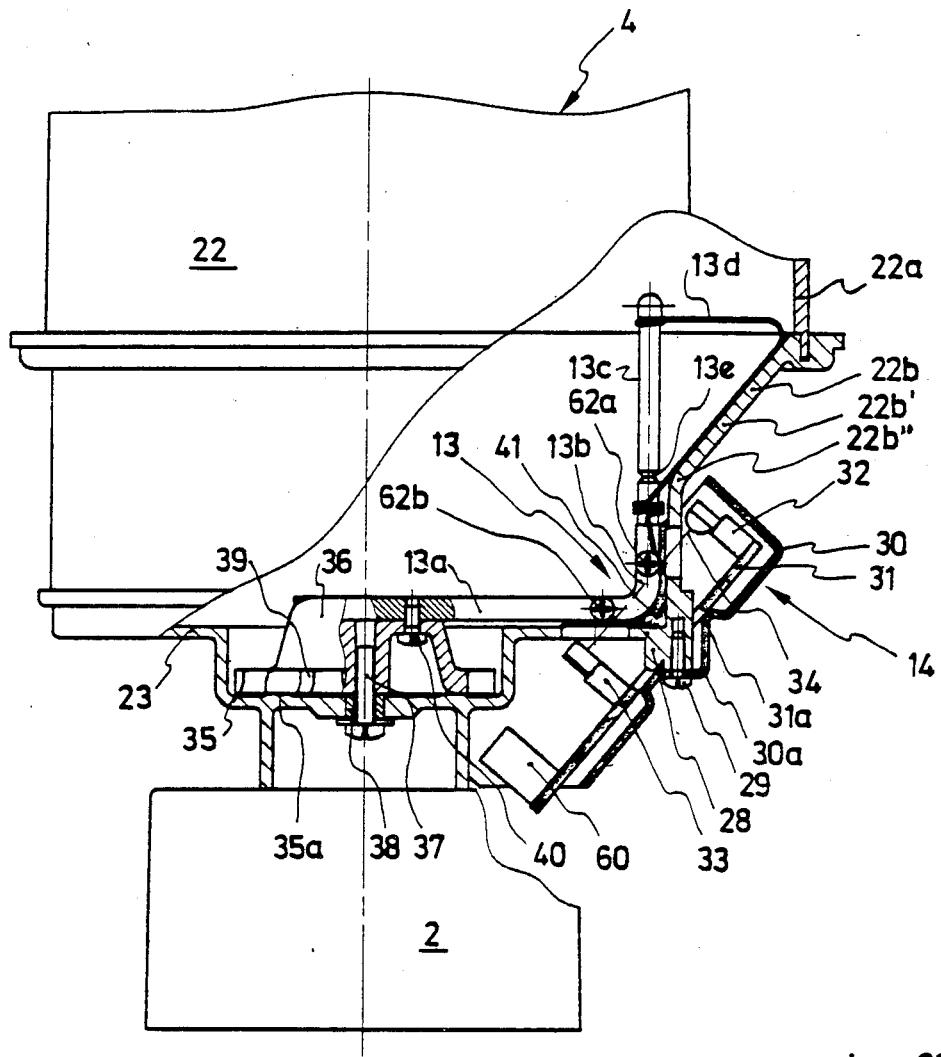
FIG. 2 shows an elevational view of the reservoir shown in FIG. 1, partially sectioned in the vicinity of a filling level sensing means, FIG. 3 showsan enlarged detail of the reservoir of FIG. 2.
Figure 3:
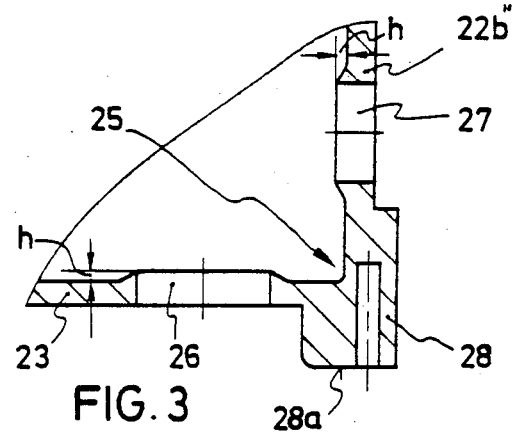
Figure 4:
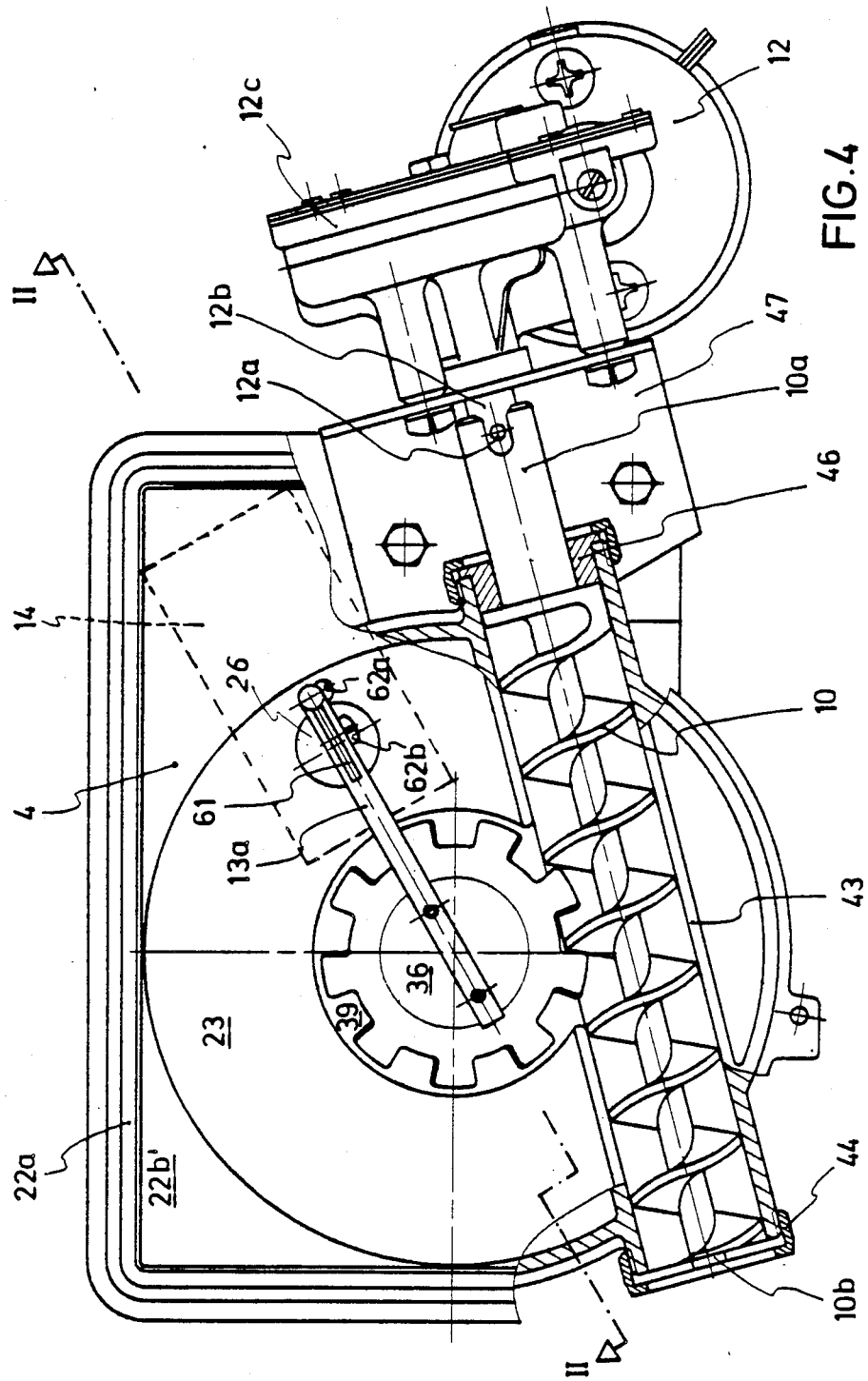
FIG. 4 shows a partially sectioned top plan view of the reservoir, and FIG. 5 showsa block circuit diagram of the filling level sensing means.

Shown in FIGS. 2 to 4 are various views, partially in section, of the coffee meal reservoir 4. Reservoir 4 has sidewalls 22 comprising four vertically extending sidewall portions 22a cooperating with one another to form a rectangular reservoir section, and a sidewall portion 22b having a part-conical portion 22b' and a cylindrical portion 22b''. The upper peripheral rim of part-conical portion 22b' of sidewall portion 22b is formed with a circumferential groove for engagement by sidewall portions 22a.

Sidewall portion 22b is configured to form a transition from sidewall portions 22a disposed at right angles to one another about a center axis, and a circular bottom wall 23 the center axis of which is aligned at an offset position with respect to the center axis of sidewall portions 22a, bottom wall 23 being integrally connected to sidewall portion 22b. Sidewall portion 22b and bottom wall 23 are formed of a transparent plastics matrial. Formed in the interior of reservoir 4 between cylindrical portion 22b' of sidewall portion 22b and bottom wall 23 is a corner 25, the term "corner" being intended to define any rectangular, acute-angled or blunt-angled as well as a rounded or any other configuration of the transition from sidewall portion 22b to bottom wall 23. Exterior of reservoir 4, the portions of bottom wall 23 and cylindrical portion 22b'' of sidewall portion 22b defining corner 25 are formed with a projection 28 comprising a seating surface 28a and an internally threaded bore for receiving a screw 29 therein. Screw 29 serves for securing a housing 30 containing electro-optical sensor 14 to the outside of reservoir 4 at a position transversely across corner 25 (FIG. 2). Secured within housing 30 is a mounting plate 31 carrying the components of the electro-optical sensor 14. The components required for the electro-optical sensor are sufficiently known from the state of the art, so that a detailed description thereof may be omitted. In the example shown, electro-optical sensor 14 is designed as a light barrier having a light source 32 as its emitter and a photocell 33 as its receiver or detector. Light source 32 and photocell 33 have their emitting and receiving portions located outside of reservoir 4 on an imaginary optical axis 34 indicated by a dash-dot line and passing through an optically transparent location 26 of bottom wall 23 and an optically transparent location 27 of cylindrical portion 22b'' of sidewall portion 22b so as to extend in a substantially diagonal direction across corenr 25 in the interior of reservoir 4. In this manner photocell 33 receives the light emitted by light source 32 when corner 25 is free of coffee meal, i.e. when reservoir 4 is substantially empty. The resultant signal is then transmitted via a connector 60 in a manner to be described below. The angle at which optical axis 34 passes through transparent locations 26 and 27 is not critical, the preferred angle being 45°, however, in which case optically transparent locations 26, 27 are disposed at equal distances from corner 25 in radial alignment with respect to the center axis of bottom wall 23. For ensuring this alignment, mounting plate 31 is formed with an opening 31a for projection 28 to extend therethrough. At a position adjacent opening 31a, housing 30 is formed with a stepped portion provided with at least one engagement surface 30a for seating surface 28a of projection 28 and screw 29, so that housing 30 can be secured to reservoir 4 together with mounting plate 31 with electro-optical sensor 14 already pre-assembled thereon. As a result, the electro-optical sensor does not require any final adjustment after housign 30 has been secured to projection 28. The boudary edges of housing 30 are configured to follow the contours of sidewall 22 and bottom wall 23 in the zones of contact.

At the location of the optically transparent tones 26 and 27, the wall thickness of bottom wall 23 and sidewall portion 22b is slightly increased, so that the inwards facing surfaces project by a distance h above the interior surfaces of bottom wall 23 and cylindrical sidewall portion 22b'', respectively. The projecting inner surfaces and the outer surfaces are polished, so that the refraction of light due to scratches is substantially avoided. It is of course also possible to form the optically transparent zones separately as windows of glass or a plastics material for insertion in suitable openings in the sidewall and bottom wall.

As particularly shown in FIGS. 2 and 4, bottom wall 23 is formed with a round recess 35 centered about its center axis. Mounted in recess 35 for rotation about an axle 37 is a drive wheel 36 for wiper 13. Axle 37 is mounted in a friction bearing sleeve 38 extending through the bottom of recess 35 and secured therein. Axle 37 has a stopper head at one end, the other end being formed with screw threads to be threaded into the hub of drive wheel 36 for rotatably mounting it within recess 35. Drive wheel 36 has a generally hat-shaped cross-sectional configuration, the "hat brim" being formed with a number of teeth 39 and supported in sliding engagement on an annular projection 35a on the bottom of recess 35. Wiper 13 is secured in a groove at the top surface of the head portion of the "hat" facing towards the interior of reservoir 4 by means of screws 40 extending from the interior of the "head portion" into engagement with a horizontal portion 13a of wiper 13. Horizontal portion 13a of wiper 13 extends through the center axis of bottom 23 and thus through the center of rotation of drive wheel 36 to a position just short of cylindrical wall portion 22b'' of sidewall portion 22b, whereat it is connected to an arcuate portion 13b. The outwards facing surfaces of wiper 13 are disposed closely to the projecting interior surfaces of optically transparent light-transmitting zones 26 and 27. The angle of arcuate portion 13b corresponds to that of corner 25, i.e. 90° in the example shown. The radius of arcuate portion 13b is as small as possible, so that wiper 13 extends far into corner 25.

Connected to arcuate portion 13b is a rectilinear portion 13c extending vertically upwards. The length of rectilinear portion 13c is selected so that the latter extends at least up to the transition from the conical portion 22b' of sidewall portion 22b to vertical sidewall portions 22a. This portion 13c of wiper 13 carries an oblique wiper member 13d the surface of which facing towards conical wall portion 22b' conforms to the dimensions and shape of conical portion 22b'' of sidewall 22 at the point of its greatest conicity so as to be substantially in full surface engagement therewith during operation. Oblique wiper member 13d is preferably formed by bending a spring steel wire to the shape of a triangle having a substantially horizontal upper leg rotatably mounted on vertical portion 13c of wiper 13, its other leg having its end portion formed as a torsion spring surrounding vertical portion 13c a short distance above arcuate portion 13b of wiper with its free end secured thereto. In this manner oblique wiper member 13d is enabled to resiliently yield in response to alterations or the disappearance, respectively, of the conicity of conical portion 22b '' of sidewall 22. Since this resilient yielding is caused by contact with the sidewall, it is ensured that the wiper is able to feed the coffee meal to screw conveyor 10 at each position around the axis of rotation of drive wheel 36, as will be discussed in detail as the description proceeds. An annular notch 13e prevents oblique wiper member 13d from being displaced along vertical wiper portion 13c.

As shown in FIG. 4, at least those portions of wiper 13 passing over light-transmitting zones 26 and 27 on rotation of the wiper are formed with a slot 61 for receiving a small wiper blade 41 secured therein by means of screws 62a and 62b. In this arrangement, screw 62b is at the same time used for securing oblique wiper member 13d (not shown in this figure for the sake of clarity).

Wiper blade 41 is made of felt, it may however also be made of any suitable material which on the one hand is physiologically unobjectionable and on the other hand will not cause scratches in the light-transmitting zones 26 and 27. In this manner it is avoided that possibly adhering coffee meal would interfere with the generation of a signal indicating the empty state of reservoir 4, the wiping action being further facilitated by the projection of the inner surfaces by the distance h.

At the side facing towards conveyor screw 10, teeth 39 of drive wheel 36 project through the wall of recess 35 into engagement with the helix of screw conveyor 10. As screw conveyor 10 is rotated by its motor 12, teeth 39 are entrained to rotate wiper 13. The movement of wiper 13 over bottom wall 23 causes coffee meal contained in reservoir 4 to be fed to a screw conveyor housing 43 secured to bottom wall 23 and opening towards the interior of reservoir 4. Screw conveyor housing 43 is of an elongate configuration conforming to the shape of screw conveyor 10 and extends at a tangent to drive wheel 36 across bottom wall 23. Screw conveyor housing 43 contains coffee meal discharge opening 11. The end of elongate screw conveyor housing 43 containing discharge opening 11 as well as the opposite end thereof are surrounded by respective bearing sleeves 44 and 45 preferably secured to conveyor screw housing 43 by threaded engagement therewith. The shaft ends 10a and 10b, respectively, of screw conveyor 10 are rotatably supported in bearing sleeves 44 and 45 in a known manner. The end of screw conveyor housing 43 containing shaft end 10a is provided with a bushing 46. Shaft end 10a extends through bushing 46 and is coupled to an output shaft 12b of a gear transmission 12c connected to motor 12 by the use of a coupling pin 12a in the known manner. Bearing sleeve 44 is provided with a centrally located hub for mounting shaft end 10b therein. The hub is surrounded by openings formed in bearing sleeve 44 for permitting the coffee meal to be discharged therethrough. As already mentioned, the rotation of screw conveyor 10 is accomplished by motor 12. Motor 12 is secured by means of screws to a vertically extending leg of an angular bracket 47, the horizontally extending leg of which is secured to housing 2 as by means of further screws.

Figure 5:
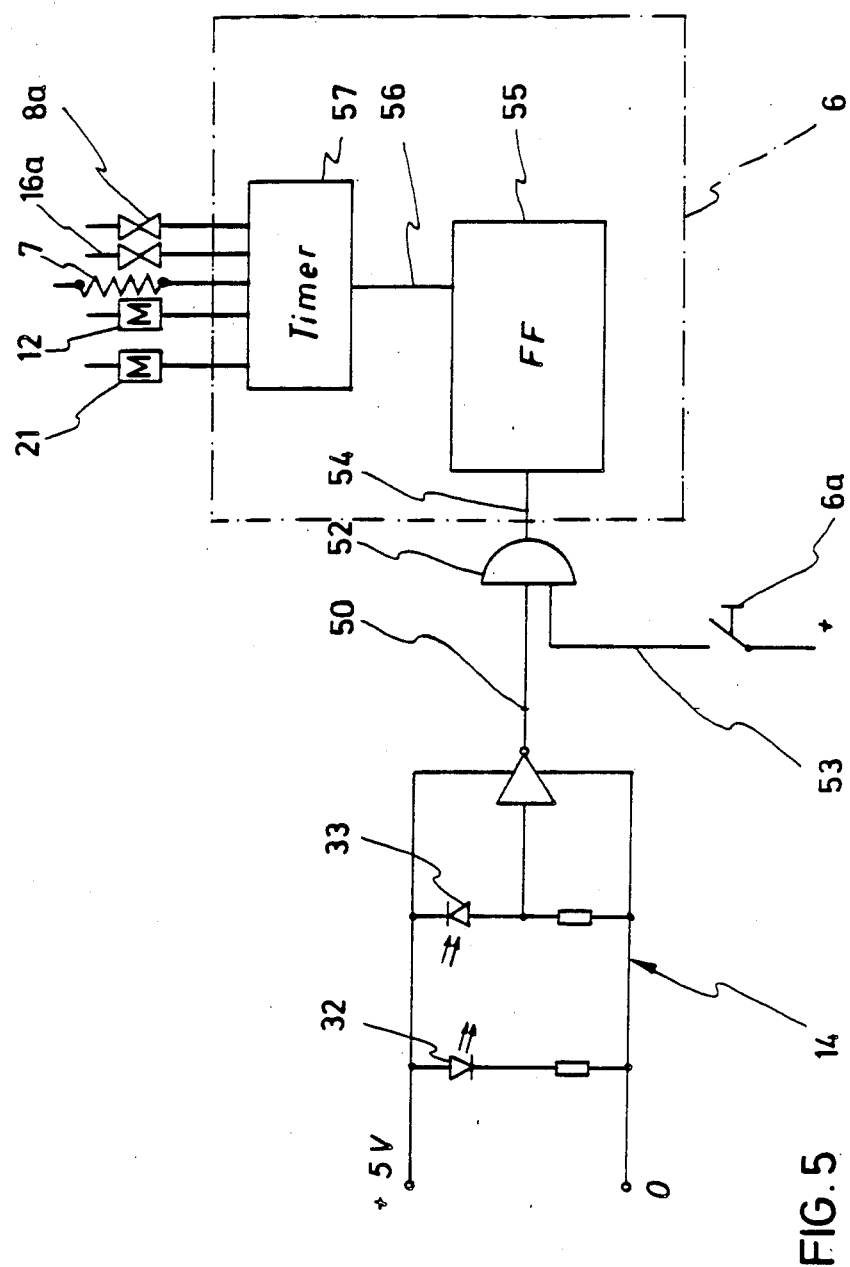

FIG. 5 shows the role played by the electro-optical sensor 14 in the control of the percolator. When there is no longer any coffee meal in corner 25, the light beam emitted by light source 32 along optical axis 34 is received by photosensor 33 and converted into an electric signal. This results in a voltage "ZERO" being applied to an AND gate 52 via conductor 50. A second conductor 53 connects AND gate 52 to manual selector switch 6a operable for initiating the brewing cycle. If under the above indicated conditions manual selector switch 6a is actuated, a brewing cycle will not be initiated because AND gate 52 is disabled by the LOW signal applied thereto via conductor 50. Only when both conductors 53 and 50 are at a positive voltage, AND gate 52 will be enabled to set a flipflop 55 via a conductor 54 for starting a brewing cycle timer 57 via a conductor 56. A circuit arrangement of this type is effective to prevent only a renewed brewing cycle from being initiated. A previously initiated brewing cycle will thus not be interrupted by a sudden activation of the light barrier, but will be continued to the end. In as much as at the time of the "empty" indication there is still a sufficient amount of coffee meal contained within the screw conveyor, the quality of the percolated coffee beverage will not either be affected. The manner in which the normal brewing operation of the coffee percolator is controlled is of no importance with respect to the present invention. The control procedure is therefore merely indicated in a general way by the diagrammatically shown control unit 6 and the various conductors leading to the individual components to be controlled, namely, valves 8a and 16a, heater 7, and motors 12 and 21.

It should be obvious that the invention is not restricted toe the embodiment described and shown by way of example in the drawings, there being numerous possible modifications imaginable within the scope of the claims. It is thus for instance readily possible to apply the invention to a construction including a round coffee meal reservoir.

We claim:

1. A coffee percolator having a reservoir for containing coffee meal, said reservoir comprising an upright sidewall, a bottom wall, and conveyor means for discharging coffee meal from said reservoir, said sidewall including at least one portion forming a corner with at least one portion of said bottom wall, said reservoir being provided with an electro-optical sensor comprising means for emitting and receiving an optical signal disposed on an optical axis outside of said reservoir, said optical axis extending through said reservoir in a substantially diagonal direction across said corner, said sidewall portion and said bottom wall portion being optically transparent at least at the locations whereat said optical axis passes therethrough.

2. A coffee percolator according to claim 1, wherein said means for emitting and receiving an optical signal are mounted on a mounting plate outside of said reservoir.

3. A coffee percolator according to claim 2, wherein said mounting plate is disposed in a housing, said housing and said reservoir being formed respectively with at least one engagement surface and one projection, said projection and said at least one engagement surface being designed to conform to one another in such a manner that said mounting plate may be secured to said reservoir with said electrooptical sensor in the operational position.

4. A coffee percolator according to claim 1, wherein said at least one portion of said sidewall and said portion of said bottom wall are formed of an optically transparent plastics material, said plastics material being polished at least at the locations whereat said optical axis passes therethrough.

5. A coffee percolator according to claim 1, wherein said optically transparent portions of said sidewall and said bottom wall are formed as small windows of a light-transmitting material inserted into said sidewall and said bottom wall.

6. A coffee percolator according to claim 4 or claim 5, wherein the surfaces of the light-transmitting locations of said sidewall and said bottom wall facing towards the interior of said reservoir project by a distance h over the inwards facing surfaces of said sidewall and said bottom wall.

7. A coffee percolator having a reservoir for coffee meal, said reservoir having an upright sidewall, a bottom wall, and conveyor means for discharging said coffee meal from said reservoir, said sidewall including at least one portion forming a corner with at least one portion of said bottom wall, said reservoir being provided with an electrooptical sensor including means for emitting and receiving an optical signal disposed on an optical axis at the outer side of said reservoir, said optical axis extending through said reservoir substantially diagonally across said corner, said portion of said sidewall and said portion of said bottom wall being optically transparent at least at the locations whereat said optical axis passes therethrough, and there being provided a rotatable wiper adapted to be moved across the optically transparent portions for the passage of said optical axis and designed for cleaning said optically transparent passage portions of coffee meal adhering thereto.

8. A coffee percolator according to claim 7, wherein said wiper is supported by a rotatable wiper arm extending a small distance above said bottom wall and designed to sweep coffee meal into said conveyor means, said wiper being provided with wiper means disposed at positions of said wiper located opposite said optically transparent passage portions.

9. A coffee percolator according to claim 8, wherein said wiper means are wiper blades secured in a slot in said wiper.

10. A coffee percolator having a reservoir for coffee meal, said reservoir comprising an upright sidewall, a bottom wall, and conveyor means for discharging coffee meal from said reservoir, said sidewall including at least one portion forming a corner with at least one portion of said bottom wall, said reservoir being provided with an electro-optical sensor including means for emitting and receiving an optical signal disposed on an optical axis at the outer side of said reservoir, said optical axis extending through said reservoir substantially diagonally across said corner, said portion of said sidewall and said portion of said bottom wall consisting of a light-transmitting plastics material, said light-transmitting plastics material being polished at least at the locations whereat said optical axis passes therethrough, the surfaces facing towards the interior of said reservoir adjacent said locations whereat said optical axis passes therethrough projecting by a distance h above the interior surface of said sidewall and said bottom wall, there being provided a rotatable wiper equipped with wiper means for cleaning said passage locations of coffee meal adhering thereto at least at portions of said wiper disposed opposite said passage locations, said wiper being driven by the movement of said conveyor means.

* * * * *